US008813376B2

(12) United States Patent
Aoyama et al.

(10) Patent No.: US 8,813,376 B2
(45) Date of Patent: Aug. 26, 2014

(54) CUTTING MACHINE (75) Inventors: Syuji Aoyama, Anjo (JP); Kenta Niwa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 320 days.

(21) Appl. No.: 13/278,818

(22) Filed: Oct. 21, 2011

(65) Prior Publication Data
US 2012/0125170 A1 May 24, 2012

(30) Foreign Application Priority Data
Nov. 19, 2010 (JP) ................................. 2010-259408

(51) Int. Cl.
B23D 49/16 (2006.01)
B23D 59/00 (2006.01)

(52) U.S. Cl.
CPC ................................. *B23D 59/006* (2013.01)
USPC ............................................ 30/392; 30/124

(58) Field of Classification Search
CPC .. B23D 49/16; B23D 59/006; B23Q 11/0042; B23Q 11/0046; B23Q 11/005; B23Q 11/006
USPC ......................... 30/123.3, 124, 392, 393, 394
See application file for complete search history.

(56) References Cited

U.S. PATENT DOCUMENTS

| 4,090,297 A * | 5/1978 | Wanner et al. ................... 30/124 |
| 4,665,617 A * | 5/1987 | Maier et al. ...................... 30/374 |
| 4,730,397 A * | 3/1988 | Weiford et al. .................. 30/392 |
| 5,012,583 A * | 5/1991 | Blochle et al. .................. 30/392 |
| 6,892,459 B2 * | 5/2005 | Okumura et al. ............. 30/123.3 |
| 6,912,788 B2 * | 7/2005 | Tam et al. ........................ 30/124 |
| 7,197,826 B2 * | 4/2007 | Baxivanelis et al. ............ 30/124 |
| 7,497,017 B2 * | 3/2009 | Bone et al. ....................... 30/392 |

FOREIGN PATENT DOCUMENTS

| DE | 37 17 585 A1 | 12/1988 |
| DE | 92 03 823.9 U1 | 7/1992 |
| DE | 10 2009 029 111 | * 3/2011 |
| EP | 0 221 652 A1 | 5/1987 |
| EP | 0 347 631 | * 8/1993 |
| JP | B2-2839519 | 12/1998 |

OTHER PUBLICATIONS

Feb. 17, 2012 Search Report issued in European Application No. 11186486.4.

* cited by examiner

*Primary Examiner* — Hwei C Payer
(74) *Attorney, Agent, or Firm* — Oliff PLC (57) ABSTRACT

A cutting machine includes a housing accommodating a motor. In the housing, a cutting blade, an air duct, a dust collecting channel and a shutter member are provided. The cutting blade is operated with the driven motor to cut a workpiece, and the air duct allows cooling air generated by a cooling fan for the motor to be blown out onto a cutting place of the workpiece. The dust collecting channel has an opening at one end for serving as a dust collecting port located near the cutting place and an opening at the other end for permitting coupling of a dust collecting nozzle. The shutter member is movable between a closed position and an open position of the air duct and located in the open position in a normal state.

9 Claims, 8 Drawing Sheets

CUTTING MACHINE

BACKGROUND OF THE INVENTION

This application claims the benefit of Japanese Patent Application Number 2010-259408 filed on Nov. 19, 2010, the entirety of which is incorporated by reference.

TECHNICAL FIELD

The present invention relates to a cutting machine which is capable of blowing air flow onto a cutting place of a workpiece, while sucking chips produced in the cutting place.

BACKGROUND ART

Japanese Patent Publication No. 2839519 discloses a cutting machine which is configured to suck or blow away the chips of a workpiece. In the cutting machine according to the device in Japanese Patent Publication No. 2839519, an air inlet duct formed in a housing opens above a suction channel in such a manner as to direct toward a cutting place of the workpiece. Further, a flap is provided in the air inlet duct to block the air flow directed toward the cutting place so as to prevent the chip suction operation from being impaired by a suction device coupled to the suction channel.

However, the above-described flap is manually operated to block the air flow, and when the flap is not operated inadvertently at the time of sucking chips, the chips will be blown away and scattered by the air flow, which may lead to deterioration in chip suction performance. Further, it has been burdensome to manually operate the flap for every operation to suck chips into the suction channel.

Under such circumstances as described above, an object of the present invention is to provide a cutting machine in which scatter of the chips by the air flow can be prevented without any manual operation to block an air flow, which suppresses deterioration in chip suction performance.

SUMMARY OF THE INVENTION

In accordance with an aspect of the present invention, a cutting machine includes a housing accommodating a motor, a cutting blade protruding from the housing, an air duct, a dust collecting channel, and a shutter member. The cutting blade to cut a workpiece is operated by the motor. The air duct allows cooling air generated by a cooling fan for the motor to be blown out onto a cutting place of the workpiece. The dust collecting channel has an opening at one end for serving as a dust collecting port located near the cutting place and an opening at the other end for permitting coupling of a dust collecting nozzle. The shutter member for opening and closing the air duct is movable between a closed position and an open position, and located in the open position in a normal state. The shutter member moves to the closed position when the dust collecting nozzle is coupled to the dust collecting channel.

According to an aspect of the present invention, when the dust collecting nozzle is coupled to the dust collecting channel, the shutter member moves to the closed position so that the cooling air for the motor is blocked to be flown out onto the cutting place of the workpiece through the air duct. To block the cooling air flow, therefore, it is only necessary to couple the dust collecting nozzle to the dust collecting channel. Consequently, the chips is prevented from being blown away by the air flow without any manual operation to block the air flow at the time of cutting the workpiece with the blade. Furthermore, it becomes easier to suck the chips produced in the cutting place into the dust collecting channel through the dust collecting port. Therefore, deterioration in chip suction performance can be suppressed.

The cutting machine may further include an operating member that allows the shutter member to move arbitrarily to the closed position from an outside of the housing.

With this configuration, the shutter member can be arbitrarily moved to the closed position of the air duct simply by operation of the operating member from the outside of the housing, without coupling the dust collecting nozzle to the dust collecting channel.

Preferably, the cutting blade has a straight shape, protrudes from the housing and reciprocates by the driven motor.

With this configuration, the chips can be prevented from being blown away by an air flow without any manual operation to block the air flow at the time of cutting the workpiece using the blade. Furthermore, it becomes easier to suck the chips produced in the cutting place into the dust collecting channel through the dust collecting port. As a result, deterioration in chip suction performance can be suppressed.

Preferably, the cutting blade having a straight shape protrudes downwardly from the front portion of the housing and reciprocates up and down by the driven motor. Further, the housing includes air duct which is directed to a rear side of the blade and opens in a lower surface of the housing. The dust collecting channel is formed in a longitudinal direction at a lower portion of the housing at a rearward of the air duct, while a rear end of the dust collecting channel has an opening on a rear surface of the housing.

With this configuration, by coupling of the dust collecting nozzle to the opening at the rear end of the dust collecting channel, the shutter member moves to the closed position of the air duct so as to block the air flow. Therefore, it can be prevented that the cooling air from the lower surface of the housing through the air duct blows out the chips out onto the cutting place of the workpiece. As it is only necessary to couple the dust collecting nozzle to the rear end of the dust collecting channel to block the cooling air, the chips are prevented from being blown away by an air flow without any manual operation to block the air flow. Furthermore, it becomes easier to suck the chips produced in the cutting place, into the dust collecting channel through the dust collecting port of the dust collecting channel provided at the rearward of the air duct. Therefore, deterioration in chip suction performance can be suppressed.

DETAILED DESCRIPTION OF THE PREFERRED EMBODIMENTS

<First Embodiment>

Figure 1:
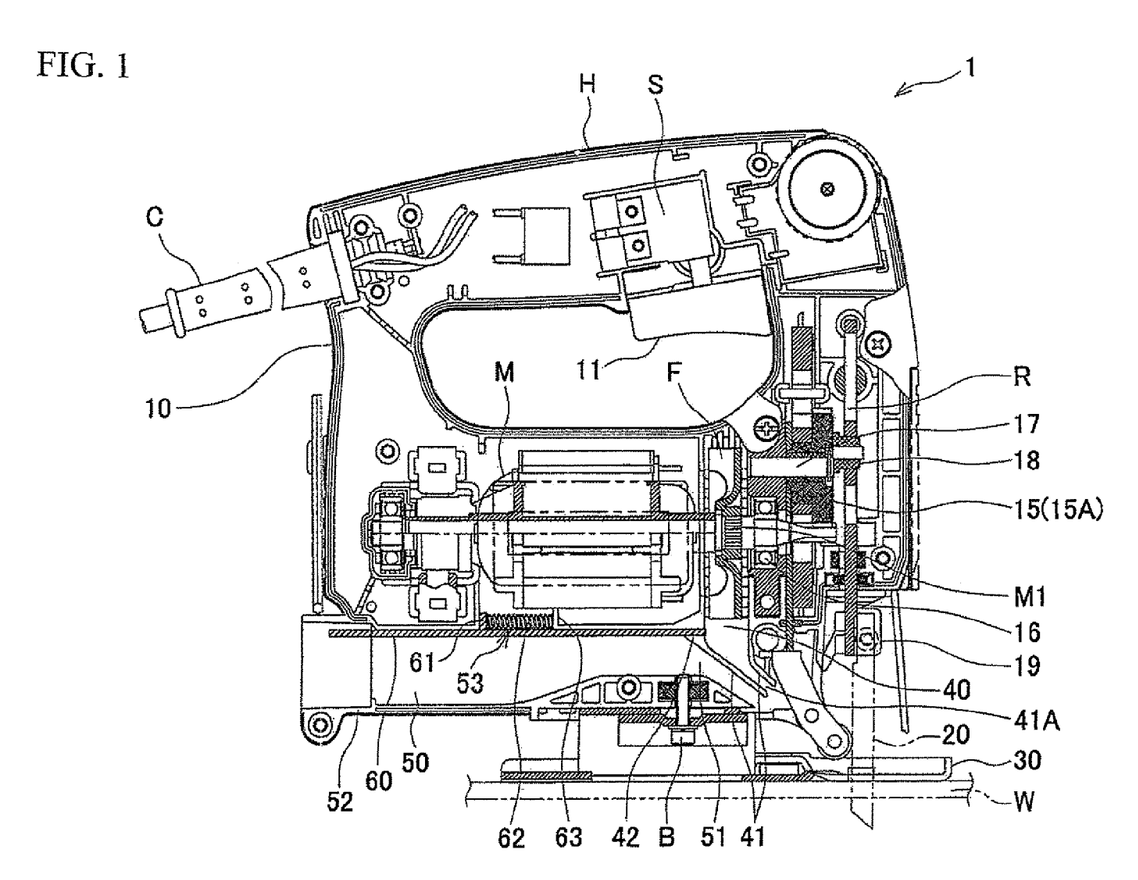
FIG. 1 is an illustration, with an air duct open, of a jigsaw according to a first embodiment of the present invention.
Figure 2:
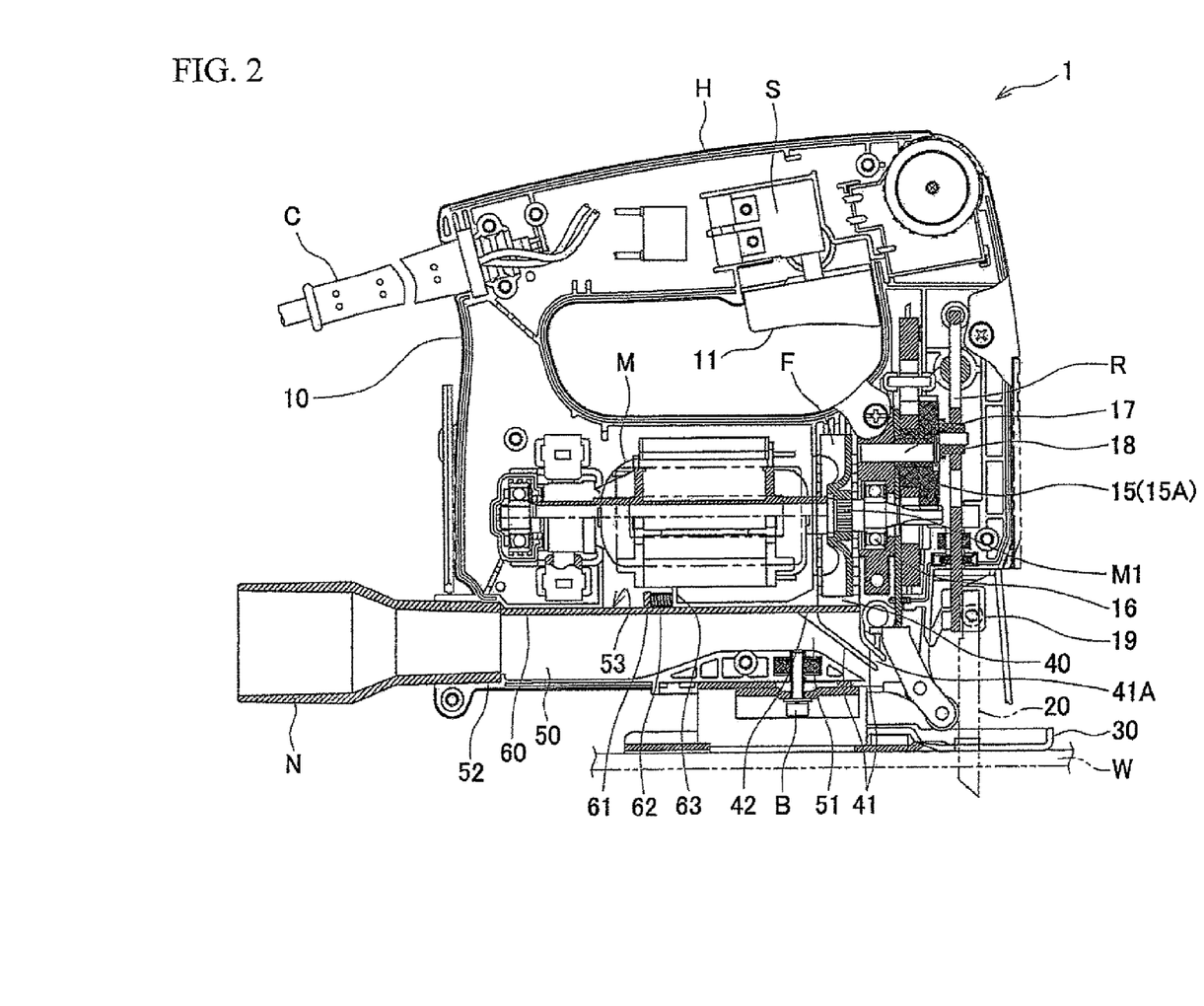
FIG. 2 is an illustration, with the air duct closed, of the jigsaw according to the first embodiment.

A first embodiment of the present invention will be described with reference to FIGS. 1 and 2. As shown in FIGS. 1 and 2, a jigsaw 1 includes a housing 10, a blade 20, a base 30, an air duct 40, a dust collecting channel 50 and a shutter member 60. It should be noted that the jigsaw 1 is an example of a cutting machine of the present invention.

A handle H is provided in an upper portion of the housing 10. A switch S having a trigger 11 for activating or deactivating the jigsaw 1 is housed in the handle H. A power cord C for supplying power to the jigsaw 1 is attached to a rear end of the housing 10 (i.e., the left side in FIG. 1).

A motor M serving as a drive source is housed at a central portion of the housing 10. A reciprocating mechanism 15 is housed at a front portion of the housing 10. A cooling fan F for cooling the motor M is mounted to an output shaft M1 of the motor M. A drive gear 15A of the reciprocating mechanism 15 has a meshing engagement with the output shaft M1 which is rotatably supported by a bearing 16 in the housing 10. On the other hand, the drive gear 15A is rotatably supported through a bearing by a shaft portion 17 which is fixed in the housing 10. An actuating portion 18 is fixed in an eccentric position on a front surface of the drive gear 15A. The actuating portion 18 revolves around the shaft portion 17 with the rotation of the drive gear 15A. Furthermore, at a front portion of the housing 10, a rod R is supported by the actuating portion 18 and designed to move up and down with one reciprocating motion per revolution of the actuating portion 18. A blade mounting portion 19 is provided on a lower end of the rod R.

A base end of a blade 20 having a liner shape is inserted into the blade mounting portion 19. The blade 20 is downwardly fixed to the blade mounting portion 19 by a bolt inserted into a hole provided in the base end of the blade 20, and the bolt is screwed by a nut. It should be noted that the blade 20 is an example of a cutting blade of the present invention. The base 30 is mounted to a lower surface of the housing 10 with a base fixing bolt B threadably mounted on the lower surface of the housing 10. The base 30 is used to rest on an upper surface of a workpiece W.

The air duct 40 is provided downward (in a downward direction in FIGS. 1 and 2) at a lower portion in the housing 10 so that the rotation of the cooling fan F leads the cooling air into the air duct 40. The air duct 40 opens on a lower surface of the housing 10, being toward the rear of the blade 20 (i.e., the left side in FIGS. 1 and 2) in the housing 10. At a lower end of the air duct 40, an air outlet nozzle 41 is provided being downwardly inclined toward the blade 20 (i.e., the right side in FIGS. 1 and 2). An outlet port 41A of the air outlet nozzle 41 is directed toward a cutting place of the workpiece W.

The dust collecting channel 50 is provided at a lower portion so as to penetrate the housing 10 in a longitudinal direction of the housing 10 (i.e., the right-left direction in FIGS. 1 and 2). At a front end of the dust collecting channel 50, a dust collecting port 51 opens adjacent to the air outlet nozzle 41 at the rear of the air duct 40. A dust collecting nozzle coupling portion 52 opens on a rear surface of the housing 10 corresponding to a rear end of the dust collecting channel 50. A slit 42 is formed in the air outlet nozzle 41 in the longitudinal direction of the housing 10 so as to communicate the space between the air duct 40 and the dust collecting channel 50.

The shutter member 60 is in a plate shape and used for opening or closing the air duct 40. In a normal state, the shutter member 60 is housed in the dust collecting channel 50, being in close contact with an upper surface of the dust collecting channel 50. In the normal state, a front end of the shutter member 60 (i.e., the right side in FIGS. 1 and 2) is inserted in the slit 42, and a rear end of the shutter member 60 (i.e., the left side in FIGS. 1 and 2) is located in the dust collecting nozzle coupling portion 52. Furthermore, in the normal state, a protrusion 61 provided on an upper surface of the shutter member 60 protrudes from a guide hole 53 provided on an upper surface of the dust collecting channel 50. Further, a coil spring 62 is held between the protrusion 61 and a rib 63 opposed to the protrusion 61. As shown in FIG. 1, the coil spring 62 urges the protrusion 61 toward the rear of the housing 10 so that the shutter member 60 is located in a position (hereinafter referred to as an open position of the air duct 40) to open the air duct 40.

On the other hand, as shown in FIG. 2, in the case where a dust collecting nozzle N is coupled to the dust collecting nozzle coupling portion 52, the dust collecting nozzle N presses a rear end of the shutter member 60 toward the front of the housing 10 against the urging force of the coil spring 62. As a result, the front end of the shutter member 60 crosses over the slit 42 and the air duct 40 is closed. In other words, when the dust collecting nozzle N is coupled to the dust collecting nozzle coupling portion 52, the shutter member 60 moves to a position (hereinafter referred to as a closed position of the air duct 40) to close the air duct 40.

Next, the operation of the jigsaw 1 will be described. When the switch S is turned on by pressing the trigger 11 into the handle H, the motor M is started driving. The drive gear 15A rotates by the driven motor M , and then the blade 20 reciprocates up and down along with the rod R and cuts the workpiece W. Additionally, when the cooling fan F rotates by the driven motor M, the cooling air for the motor M is sucked into the housing 10 from an inlet (not shown) of the housing 10 to cool the motor M. After that, the cooling air flows sequentially through the air duct 40 and the air outlet nozzle 41, and is blown out from the outlet port 41A onto the cutting place of the workpiece W. When the shutter member 60 is in the open position of the air duct 40, as shown in FIG. 1, chips produced in the workpiece W can be blown away by utilizing the cooling air blown out from the outlet port 41A.

On the other hand, in the case where the chips produced in the cutting place are collected through the dust collecting port 51, the dust collecting nozzle N is coupled to the dust collecting nozzle coupling portion 52 as shown in FIG. 2, thereby making the shutter member 60 move to the closed position of the air duct 40. Then, a dust collecting machine (not shown) is coupled to the dust collecting nozzle N through a dust collecting hose (not shown). When the dust collecting machine is started operation, chips are sucked through the dust collecting port 51 and the chips are led a tank of the dust collecting machine sequentially through the dust collecting channel 50, the dust collecting nozzle N, and the dust collecting hose. When the shutter member 60 is located in the closed position of the air duct 40, scatter of the chips due to the cooling air is prevented. Therefore, an effective collection of chips can be performed through the dust collecting port 51 into the dust collecting channel 50. After completing the chip collection operation, the dust collecting nozzle N is removed from the dust collecting nozzle coupling portion 52. At this time, the shutter member 60 is moved to the open position of the air duct 40 by the coil spring 62.

<Advantages of First Embodiment>

In the jigsaw 1 according to the first embodiment, when the dust collecting nozzle N is coupled to the dust collecting nozzle coupling portion 52 of the dust collecting channel 50, shutter member 60 moves to the closed position of the air duct 40 and blocks the air flow from the air duct 40. Thus, it is possible to prevent the cooling air for the motor M from being blown out onto the cutting place of the workpiece W from the lower surface of the housing 10 through the air duct 40. To block the cooling air flow, therefore, it is only necessary to couple the dust collecting nozzle N to the dust collecting nozzle coupling portion 52. Consequently, the chips can be prevented from being blown away by the air flow without any manual operation to block an air flow at the time of cutting the workpiece W with the blade 20. Furthermore, it becomes easier to suck the chips produced in the cutting place into the dust collecting channel 50 through the dust collecting port 51. Therefore, deterioration in chip suction performance is suppressed.

<Second Embodiment>

Figure 3:
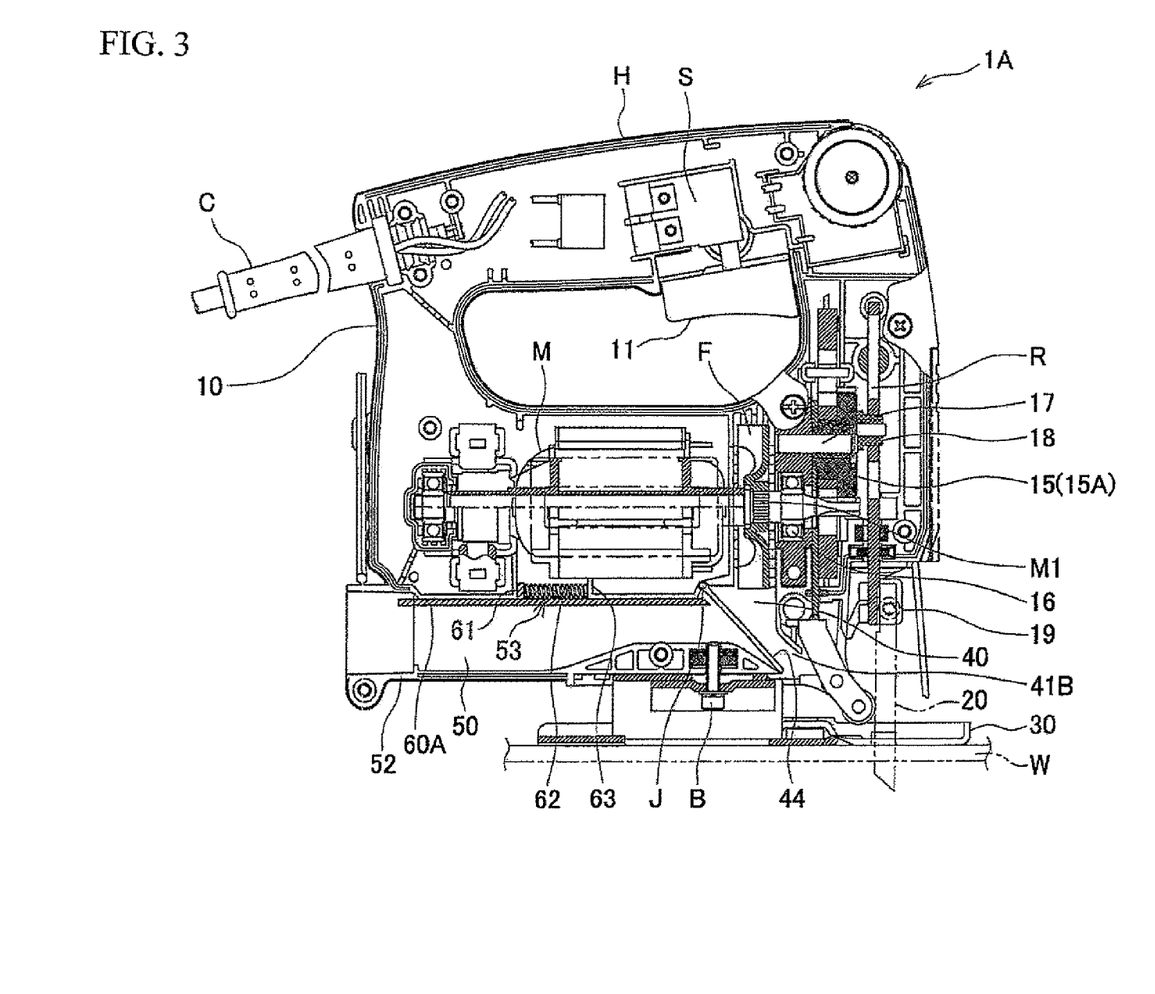
FIG. 3 is an illustration, with an air duct open, of a jigsaw according to a second embodiment.
Figure 4:
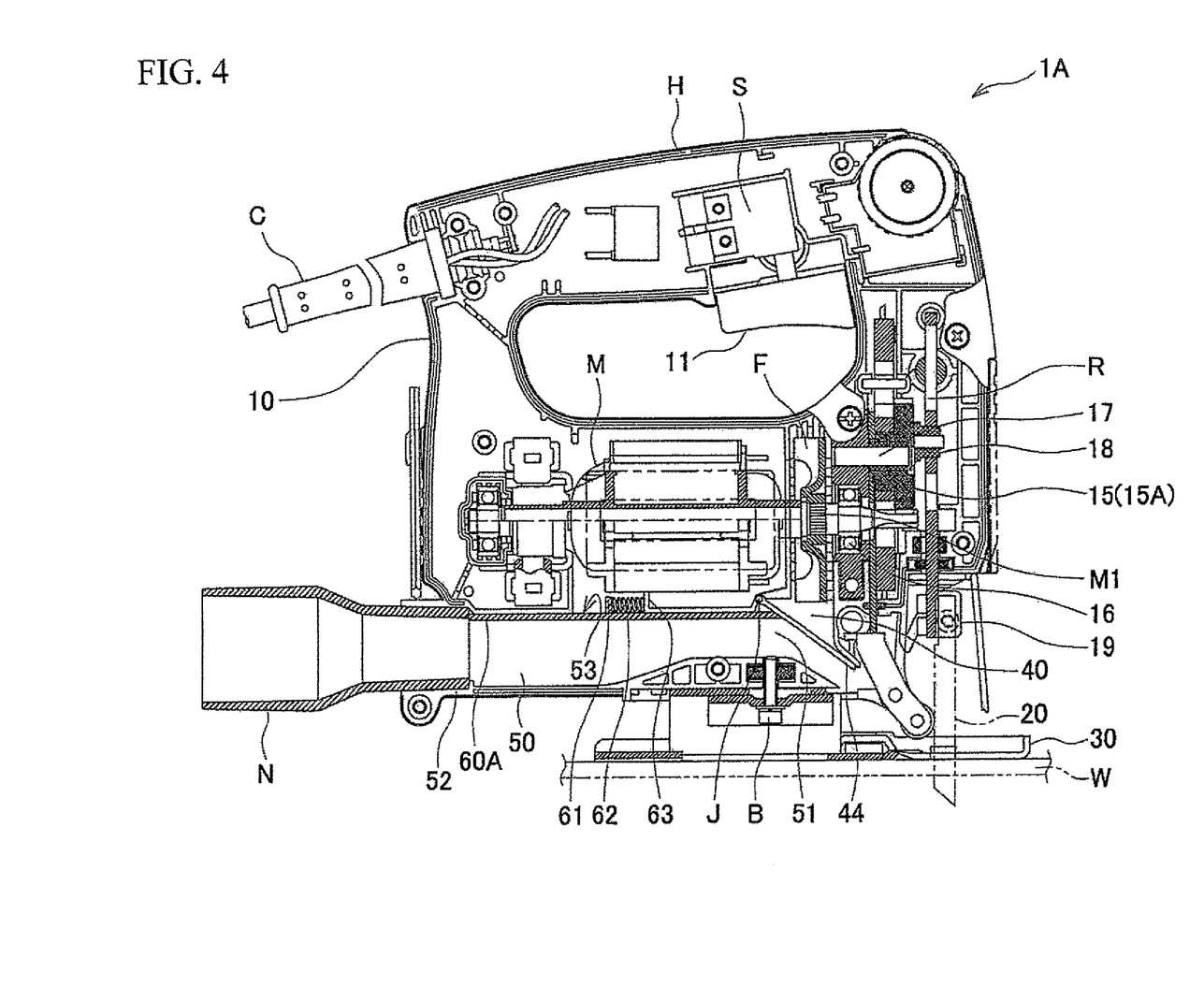
FIG. 4 is an illustration, with the air duct closed, of the jigsaw according to the second embodiment.

A second embodiment of the present invention will be described with reference to FIGS. 3 and 4 in which the same elements as those in the first embodiment are designated by the same reference signs, and a description thereof will not be repeated. In a jigsaw 1A according to the second embodiment, an outlet port 41B including an opening and closing plate 44 is provided at a lower end of the air duct 40 so as to be downwardly inclined toward the blade 20. The opening and closing plate 44 is journaled for turning movement on a spindle J in the housing 10 at the rear of the air duct 40. A front end of a shutter member 60A is normally located at the rear of the opening and closing plate 44.

Then the operation of the jigsaw 1A will be described. As shown in FIG. 3, in a normal state, the opening and closing plate 44 closes the dust collecting port 51 under its own weight and opens the outlet port 41B. Therefore, when the cooling fan F rotates, the cooling air is blown out from the outlet port 41B onto the cutting place of the workpiece W. On the other hand, in the case where the chips produced in the cutting place are collected through the dust collecting port 51, the dust collecting nozzle N is coupled to the dust collecting nozzle coupling portion 52 as shown in FIG. 4. By this coupling, the dust collecting nozzle N presses a rear end of the shutter member 60A toward the front of the housing 10 against the urging force of the coil spring 62, so that the shutter member 60A moves to the closed position of the air duct 40. At the closed position of the air duct 40, the front end of the shutter member 60A abuts on the opening and closing plate 44 so that the opening and closing plate 44 rotates about the spindle J. Since the outlet port 41B is closed by this rotation, the dust collecting port 51 is opened and the air duct 40 is closed. Thus, the cooling air is prevented from flowing through the air duct 40 to the outlet port 41B. Consequently, the cooling air from the outlet port 41B is prevented from being blown onto the cutting place.

<Advantages of Second Embodiment>

In the jigsaw 1A according to the second embodiment, in the same manner as the first embodiment, it is also possible to prevent the chips from being blown away by air flow without any manual operation for blocking an air flow at the time of cutting the workpiece W. It is also possible to suppress deterioration in the performance for sucking the chips produced in the cutting place.

<Third Embodiment>

Figure 5:
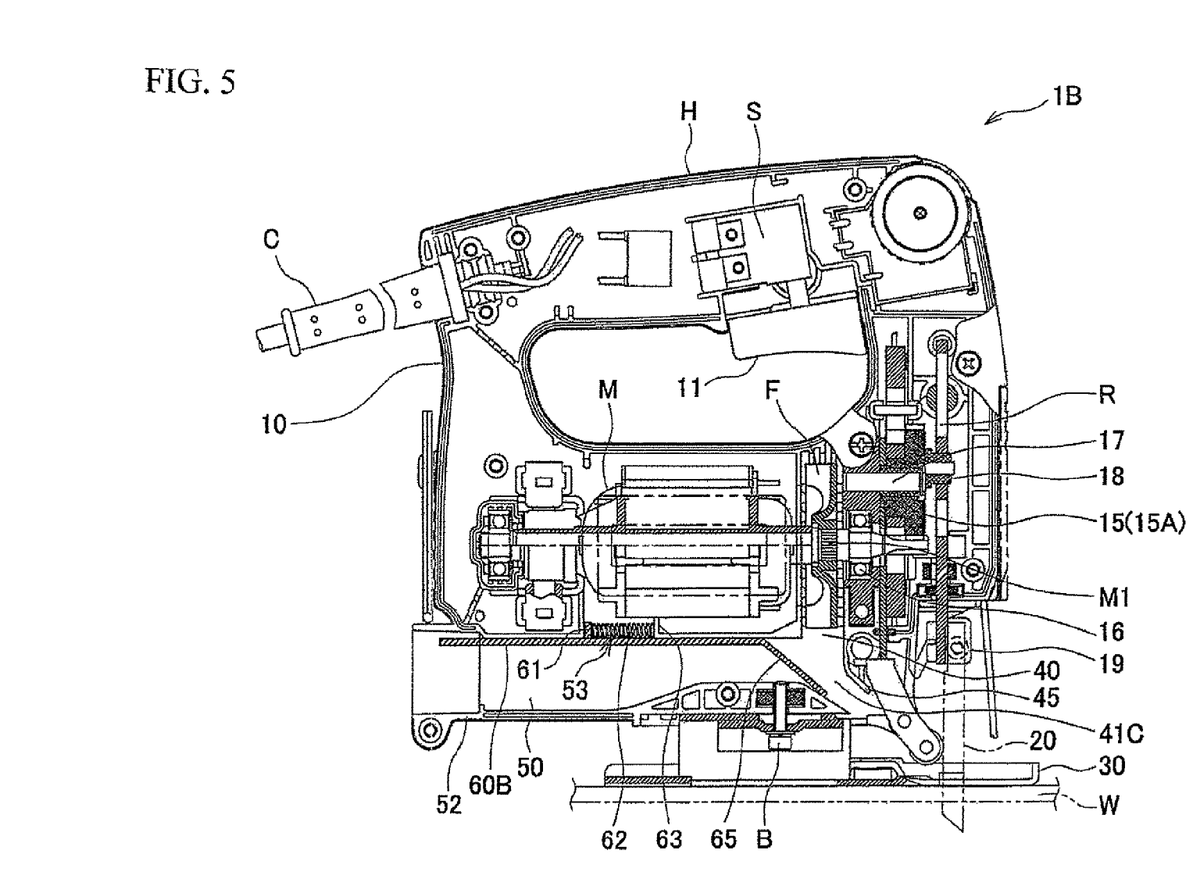
FIG. 5 is an illustration, with an air duct open, of a jigsaw according to a third embodiment.
Figure 6:
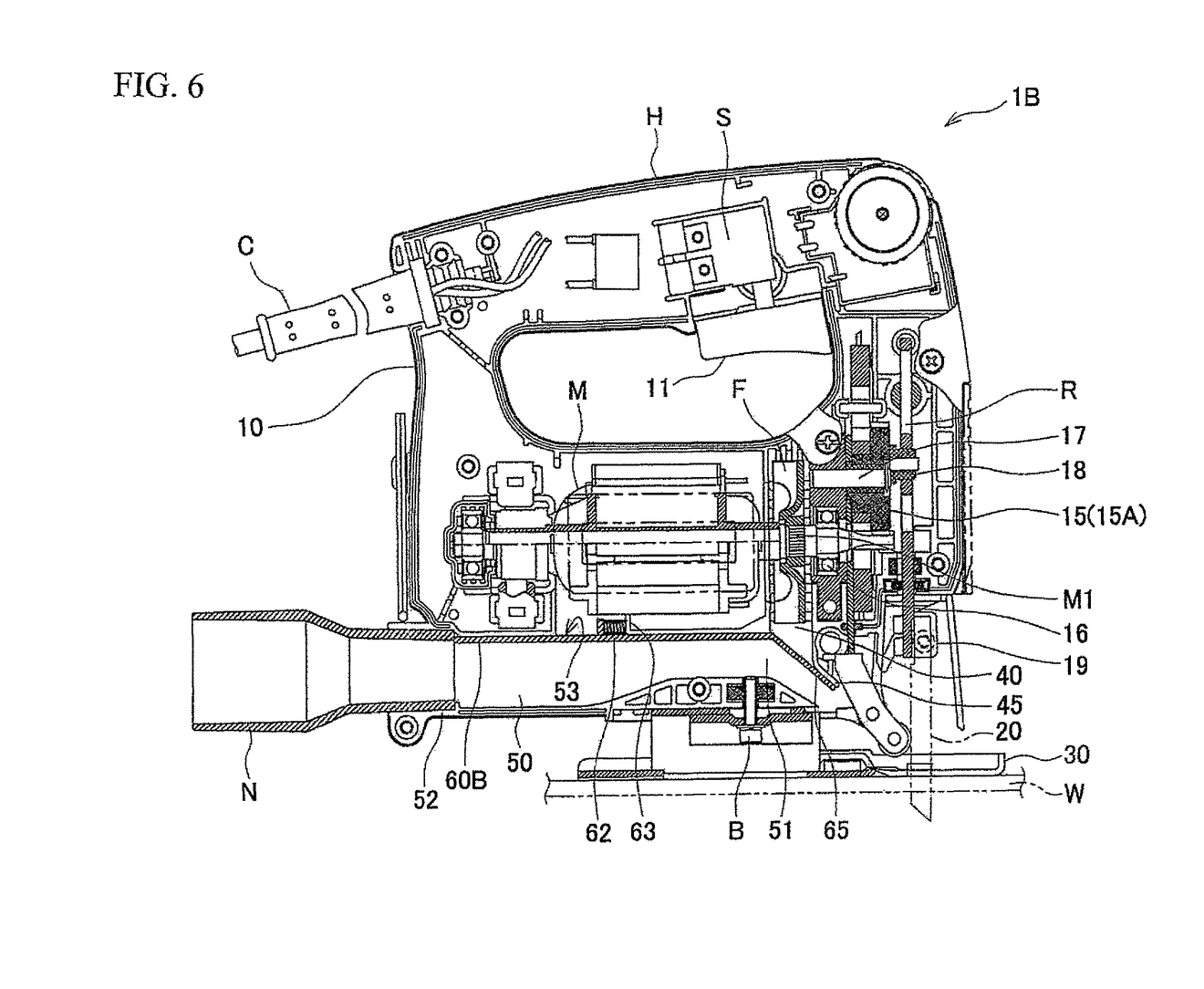
FIG. 6 is an illustration, with the air duct closed, of the jigsaw according to the third embodiment.

A third embodiment of the present invention will be described with reference to FIGS. 5 and 6 in which the same elements as those in the first embodiment and the second embodiment are designated by the same reference signs, and a description thereof will not be repeated. In a jigsaw 1B according to the third embodiment, an inclined portion 65 is formed at a front end of a shutter member 60B inclined obliquely downward toward the front of the housing 10. The inclined portion 65 is normally located at a lower end and at the rear of the air duct 40. A cooling air guiding portion 45 downwardly inclined toward the blade 20 is provided at a lower end of the air duct 40 in front of the inclined portion 65. In a normal state, a space between the cooling air guiding portion 45 and the inclined portion 65 forms an outlet port 41C of the outlet nozzle.

Then the operation of the jigsaw 1B will be described. As shown in FIG. 5, in the normal state, the inclined portion 65 abuts on a lower surface of the dust collecting channel 50 to thereby close the dust collecting port 51 and open the outlet port 41C. Thus, when the cooling fan F rotates, the cooling air is blown out from the outlet port 41C onto the cutting place of the workpiece W. On the other hand, in the case where the chips produced in the cutting place are collected through the dust collecting port 51, the dust collecting nozzle N is coupled to the dust collecting nozzle coupling portion 52 as shown in FIG. 6, thereby making the shutter member 60B move to the closed position of the air duct 40, in the same manner as the first and second embodiments. Thus, the inclined portion 65 opens the dust collecting port 51, and then closes the outlet port 41C in close contact with the cooling air guiding portion 45, thereby also closing the air duct 40 in communication with the outlet port 41C. Consequently, the cooling air is prevented from being blown out from the outlet port 41C onto the cutting place.

<Advantages of Third Embodiment>

In the jigsaw 1B according to the third embodiment, in the same manner as the first and second embodiments, it is possible to prevent the chips from being blown away by the air flow without any manual operation to block the air flow at the time of cutting the workpiece W with the blade 20. It is also possible to suppress deterioration in the performance for sucking the chips produced in the cutting place.

<Fourth Embodiment>

Figure 7:
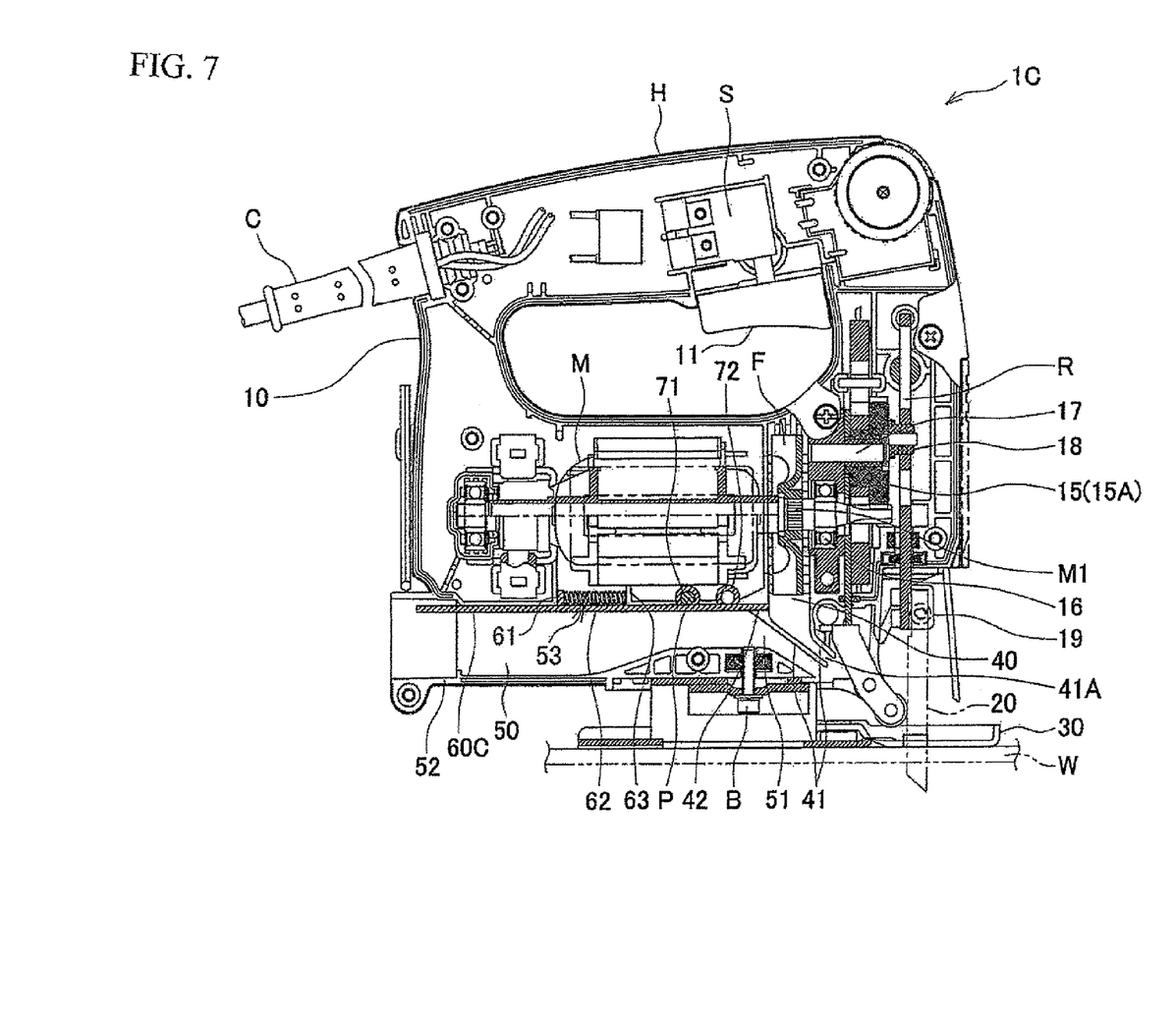
FIG. 7 is an illustration, with an air duct open, of a jigsaw according to a fourth embodiment.
Figure 8:
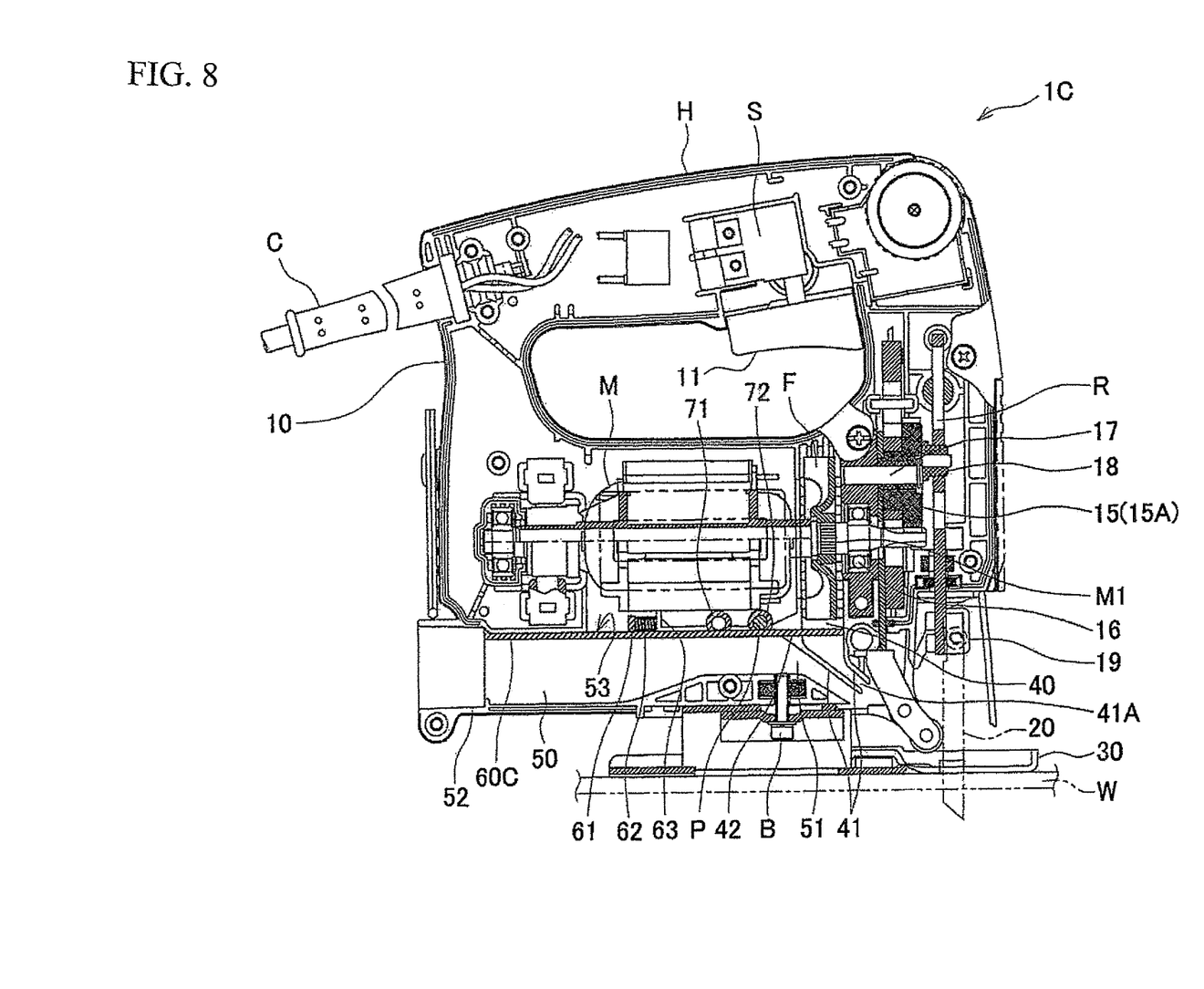
FIG. 8 is an illustration, with the air duct closed, of the jigsaw according to the fourth embodiment.

A fourth embodiment of the present invention will be described with reference to FIGS. 7 and 8 in which the same elements as those in the first to third embodiments are designated by the same reference signs, and a description thereof will not be repeated. A lock pin P is supported slidably in the right-left direction on an upper surface of a shutter member 60C according to the forth embodiment. A leading end of the lock pin P protrudes from an elongate hole (not shown) that opens in a side surface of the housing 10 in an elongated manner in a longitudinal direction (i.e., the right-left direction in FIGS. 7 and 8). Further, sleeves 71, 72 are provided in the housing 10. The sleeve 71 allows the lock pin P to press and fit into the housing 10 when the shutter member 60C is located in the open position of the air duct 40. Similarly, the sleeve 72 allows the lock pin P to press and fit into the housing 10 when the shutter member 60C is moved to the closed position of the air duct 40.

Then the operation of the jigsaw 1C will be described with an example in which the jigsaw 1C cuts an iron material as the workpiece W. As shown in FIG. 7, in a normal state, the shutter member 60C is located in the open position of the air duct 40. At this time, when the lock pin P is pressed into the housing 10, a rear end of the lock pin P fits and engages in the sleeve 71, thereby allowing fixation of the shutter member 60C in the open position of the air duct 40.

On the other hand, in the case where oil or oil solution is applied to a cutting place of the iron material, and iron powder or the like produced in the cutting place is collected through the dust collecting port 51, the lock pin P is pulled outwardly of the housing 10 to release the engagement with the sleeve 71. And then by sliding the lock pin P as it is toward the front of the housing 10, the shutter member 60C is moved to the closed position of the air duct 40 as shown in FIG. 8. Thereafter, the lock pin P is engaged in the sleeve 72 in a manner similar to engagement of the lock pin P in the sleeve 71, thereby allowing the shutter member 60C to be fixed in the closed position of the air duct 40. Since at this time the air duct is closed, the cooling air is blocked to be blown onto the cutting place. Therefore, scatter of the oil or oil solution applied to the cutting place is avoided. After completing the operation to collect iron powder or the like, by releasing the engagement between the lock pin P and the sleeve 72, the shutter member 60C moves to the open position of the air duct 40 with the coil spring 62. It is should be noted that the lock pin P is an example of an operating member of the present invention.

<Advantages of Fourth Embodiment>

In the jigsaw 1C according to the forth embodiment, it is possible to arbitrarily move the shutter member 60C to the closed position of the air duct 40 simply by sliding the lock pin P toward the front of the housing 10 from the outside of the housing 10, without coupling the dust collecting nozzle N to the dust collecting nozzle coupling portion 52.

It should be understood that the present invention is not limited to the above-described embodiments, but may be practiced with partial and appropriate changes in structure without departing from the scope of the present invention. For example, unlike the above-described embodiments, the arrangement may be such that, in the fourth embodiment, an externally threaded portion is formed on an outer peripheral surface of the lock pin and an internally threaded portion is formed on a recessed portion of the sleeve so that the shutter member 60 is fixed in the open or closed position of the air duct 40 by screwing the externally threaded portion into in the internally threaded portion.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims.

What is claimed is:

1. A cutting machine comprising:
   a housing;
   a motor housed in the housing;
   a cutting blade provided in the housing, being operated with driving of the motor to cut a workpiece;
   an air duct formed in the housing, allowing cooling air generated by a cooling fan for the motor to be blown out onto a cutting place of the workpiece;
   a dust collecting channel formed in the housing, having an opening at one end for serving as a dust collecting port located near the cutting place and an opening at the other end for permitting coupling of a dust collecting nozzle; and
   a shutter member provided in the housing, being movable between a closed position and an open position of the air duct and located in the open position in a normal state, the shutter member moving to the closed position to close the air duct to prevent the cooling air for the motor from being blown out onto the cutting place of the workpiece from a lower surface of the housing through the air duct in response to coupling of the dust collecting nozzle to the dust collecting channel.

2. The cutting machine according to claim 1, further comprising an operating member for allowing the shutter member to move arbitrarily to the closed position from an outside of the housing.

3. The cutting machine according to claim 1, wherein the cutting blade has a liner shape protruding from the housing and reciprocating with the motor.

4. The cutting machine according to claim 1, wherein the cutting blade having a liner shape downwardly protrudes in front of the housing and reciprocating by the motor, the air duct is formed downwardly at a rear of the blade and opens on the lower surface of the housing, the dust collecting channel is formed in a longitudinal direction at a lower portion of the housing at a rear of the air duct, and a rear end of the dust collecting channel opening on a rear surface of the housing.

5. The cutting machine according to claim 2, wherein the operating member is a lock pin supported by the shutter member and movable between the closed position and the open position, and the housing is provided with an elongate hole and a sleeve, the elongate hole allowing a leading end of the lock pin to protrude therefrom and being elongated in a moving direction of the shutter member, the sleeve allowing the lock pin to fit therein in the closed position.

6. The cutting machine according to claim 4, further comprising an air outlet nozzle formed on the lower surface of the housing with the air duct open, the air outlet nozzle being directed to the blade,
   wherein the air outlet nozzle is provided with a slit allowing communication of space between the air outlet nozzle and the dust collecting channel, and the dust collecting nozzle coupled to the rear end of the dust collecting channel causes the shutter member housed in the dust collecting channel and movable in the longitudinal direction and having a plate shape to move through the slit to the closed position.

7. The cutting machine according to claim 4, further comprising an opening and closing plate journaled for turning movement on a spindle on the lower surface of the housing with the air duct open, the opening and closing plate closing the dust collecting port in the normal state and forming an air outlet port directed to the blade, wherein, when the dust collecting nozzle is coupled to the dust collecting channel, the shutter member housed in the dust collecting channel and movable in the longitudinal direction and having a plate shape abuts on the opening and closing plate in such a manner as to cause the opening and closing plate to turn about the spindle to open the dust collecting port and close the air outlet port.

8. The cutting machine according to claim 4, further comprising:
   a cooling air guiding portion provided on the lower surface of the housing with the air duct open, the cooling air guiding portion being inclined toward the blade; and
   an inclined portion provided on a front end of the shutter member housed in the dust collecting channel and movable in the longitudinal direction and having a plate shape, the inclined portion being located at a rear of the cooling air guiding portion and closing the dust collecting port in the normal state to form an air outlet port in space between the cooling air guiding portion and the inclined portion,
   wherein, when the dust collecting nozzle is coupled to the dust collecting channel, the shutter member moves toward the cooling air guiding portion to open the dust collecting port and close the air outlet port with the inclined portion in close contact with the cooling air guiding portion.

9. The cutting machine according to claim 1, further comprising a coil spring housed in the housing, the coil spring urging the shutter member toward the open position in the normal state.

* * * * *